Aug. 28, 1956
F. J. LANE
2,760,238
TRAILER VESTIBULE CONSTRUCTION
Filed Feb. 18, 1952
2 Sheets-Sheet 1
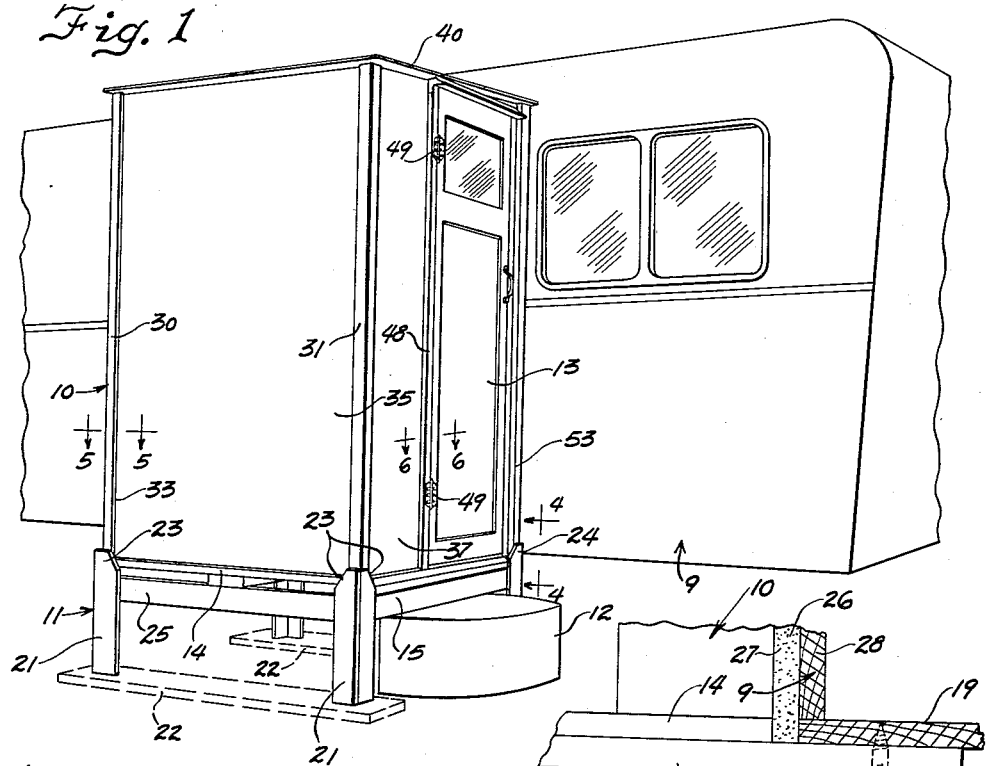
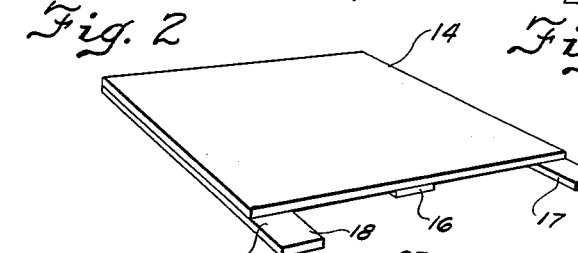
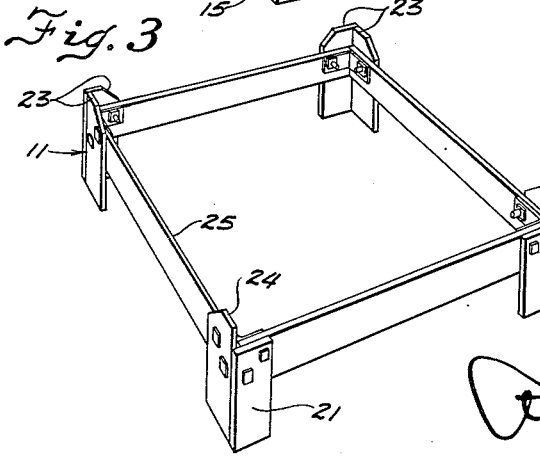
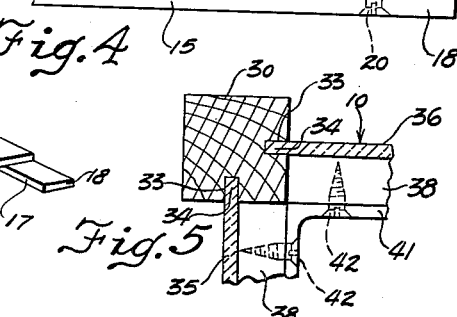
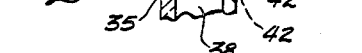
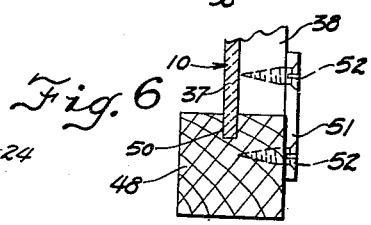
Inventor
Frank J. Lane
Andrew F. Wintercorn
Atty.

Aug. 28, 1956 — F. J. LANE — 2,760,238
TRAILER VESTIBULE CONSTRUCTION
Filed Feb. 18, 1952
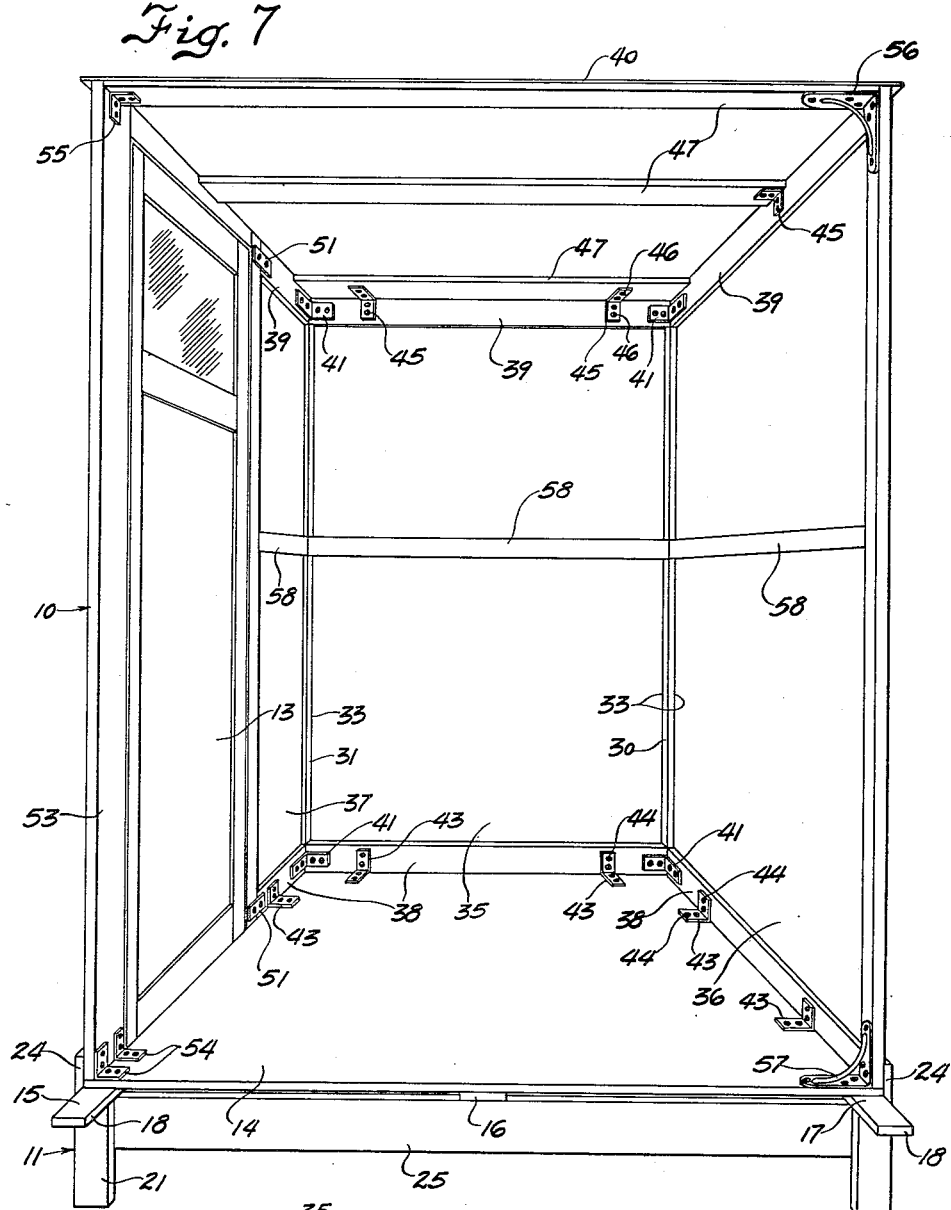
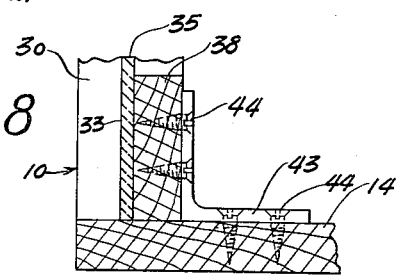
Inventor
Frank J. Lane United States Patent Office 2,760,238
Patented Aug. 28, 1956

2,760,238

TRAILER VESTIBULE CONSTRUCTION

Frank J. Lane, Oklahoma City, Okla., assignor of one-half to John J. Domino, Rockford, Ill.

Application February 18, 1952, Serial No. 272,012

3 Claims. (Cl. 20—2)

This invention relates to house trailers and is more particularly concerned with improvements in auxiliary building constructions therefor, such as vestibules.

The principal object is to provide a detachable entrance vestibule for house trailers that may be quickly set up and attached to the side of the trailer at the camp site and as quickly taken apart later and stored away in the trailer in knocked-down form in transit.

A salient feature of the present construction is the provision of projecting cleats under the floor of the vestibule arranged to engage under the floor of the trailer so as to locate the vestibule floor substantially flush with the trailer floor when the vestibule structure is jacked up in abutment with the trailer preparatory to the insertion of the supporting base under it, this simple expedient having been found to anchor the whole vestibule in rigid relation to the trailer so that it is rarely, if ever, necessary to insert screws through the projecting ends of the cleats to fasten the same to the bottom of the trailer. Compressible strips of sponge rubber are interposed between the side of the trailer and the vestibule to seal the joint and at the same time protect the side wall of the trailer against the possibility of marring. The supporting base is made of a special design that permits slipping it in place under the vestibule from the outer side in telescoping relation to the bottom of the vestibule and when in place it not only affords the necessary support but gives the ensemble an appearance of permanence and stability.

Another object is to provide a knock-down vestibule structure in which the parts are made to interfit in such a way that surprising rigidity is obtained although the number of fastenings which it is necessary to apply are reduced substantially to a minimum. For example, the panels on adjoining sides fit in grooves cut in adjoining sides of the corner posts and right angle straps fastened permanently to the one panel and abutting the other panel when the two panels are so assembled on a corner post can be fastened to the second panel, each with a couple of screws, to complete a sound corner construction. A similar expedient suffices where a panel enters a single groove provided in one side of a post, like that provided at the door opening, where a straight strap fastened to the panel needs only a couple of screws to fasten it to the post to complete the assembly.

The invention is illustrated in the accompanying drawings, in which—

Fig. 1 is a perspective view of a house trailer showing applied thereto a vestibule made in accordance with my invention;

Fig. 2 is a perspective view of the vestibule bottom or floor;

Fig. 3 is a perspective view of the supporting base or standard;

Fig. 4 is a sectional detail on the line 4—4 of Fig. 1 with the supporting base removed;

Figs. 5 and 6 are sectional details on the lines 5—5 and 6—6 of Fig. 1;

Fig. 7 is a perspective view looking into the vestibule from the open side that is adapted to have abutment with the trailer, and Fig. 8 illustrates a typical connection as used in tying all of joints of the structure, at the top, bottom and sides.

The same reference numerals are applied to corresponding parts through the views.

Referring to the drawings, the reference numeral 9 designates the house trailer generally and 10 the vestibule or other auxiliary building structure generally, made in accordance with my invention, the latter being shown in Figs. 1 and 7 supported on a base or standard 11 of special design. A suitable entry step 12 is also illustrated in Fig. 1, placed in front of the vestibule door 13, it being, of course, understood that the vestibule 10 is placed adjacent the entry door of the trailer, so that one may enter the trailer through the vestibule. The vestibule not only provides better privacy but also greater comfort, particularly in cold weather, besides adding much needed space in small and medium sized trailers. As can be seen in Fig. 1, it also improves the appearance of the trailer as a whole. While, as later described, the present vestibule is of knock-down construction adapted to be taken apart quickly and stored away in the trailer in transit, it is anticipated that many trailer camp proprietors will keep in stock several of these vestibules set up ready for use and rent them to visiting trailer owners partly as a matter of accommodation and also to improve the general appearance of the trailer camp and thereby attract more prospective customers to the camp.

The floor or bottom 14 of the vestibule 10 is illustrated in Fig. 2 as made of a single panel of plywood, to the bottom of which are secured longitudinally extending parallel wooden cleats 15, 16 and 17, the cleats 15 and 17 having the inner end portions 18 projecting a foot or so beyond the inner edge of the floor 14 as locating extensions to underlie the bottom 19 of the trailer, as indicated in Fig. 4, and thereby locate the floor 14 of the vestibule substantially flush with the floor of the trailer. Ordinarily this lap connection is sufficient by itself to keep the vestibule 10 in good register with the trailer 9, but I may provide screws 20, as shown in Fig. 4, to fasten the projecting end portions 18 to the bottom of the trailer. The vestibule 10 is, of course, supported on the floor 14, as illustrated in Fig. 7, and in the application of the vestibule to the trailer it is only necessary to enter the projecting end portions 18 under the trailer body on opposite sides of the door opening and then jack up the vestibule so as to engage the end portions 18 firmly against the bottom of the trailer. Then, while the vestibule is jacked up, the supporting base or standard 11 is slid into position under the floor 14, suitable shims being entered under the legs 21 of the base, as indicated at 22 in Fig. 1, to take up any clearances and at the same time protect the legs 21 from moisture and eliminate likelihood of the legs digging in the ground. The base 11 has the legs 21 projecting upwardly on both sides of each of the outer corners, as indicated at 23, for abutment with adjoining sides of the outer corners of the body of the vestibule, as indicated in Fig. 1, but, at the inner end of the base, there is only one upwardly projecting portion 24 on one side of each corner for abutment with the vestibule body at the front and back, as shown in Fig. 7. In that way, the base 11 has a telescoping fit on the bottom of the vestibule and can be slid into and out of operative position endwise, the rectangular frame 25 affording support for the vestibule by engagement with the cleats 15, 16, and 17, as illustrated in Fig. 7. In passing, attention is called to the strip 26 of compressible sponge rubber that is indicated in Fig. 4 as cemented at 27 to the inner face of the vestibule and arranged to be compressed against the wall 28 of the trailer when the vestibule is applied to the trailer. In practice, the projecting ends 18 are brought into position under the trailer and that side of the vestibule is jacked up first to the approximate height of the floor of the trailer, and then the outer side of the vestibule is jacked up to make the vestibule "jacknife" into abutment with the side of the trailer, compressing the sponge rubber strips 26 that extend lengthwise of the top and floor and the front and back walls of the vestibule.

The knock-down construction of the vestibule involves such details of construction as are shown in Figs. 2, 3, 5, 6, 7, and 8. The floor panel 14 with its cleats 15—17 is one element, as shown in Fig. 2, and the base 11, as shown in Fig. 3, is another element. The rest of the vestibule is adapted to be set up upon the floor 14, as shown in Figs. 5 to 8. Thus, there are two corner posts 30 and 31 at the outer end of the vestibule, in the adjoining sides of which vertically extending grooves 33 are provided, as shown in Fig. 5, post 30 being adapted to receive the edge portions 34 of an end wall panel 35 and rear wall panel 36 and post 31 being adapted to receive the edge portions of the end wall panel 35 and front wall panel 37. Baseboards and ceiling boards 38 and 39, respectively, are nailed to the bottom and top inner sides of the panels 35, 36, and 37, to lend rigidity, inasmuch as these panels are made of any suitable thin and fairly pliable building board, and these boards 38 and 39 are also used as a means of fastening together the adjoining sides at each corner of the vestibule structure, and also to fasten these walls down to the floor 14 and onto the top or roof 40, as clearly appears in Fig. 7. Thus, as shown in Figs. 5 and 7, there are right angle straps 41 at each corner, which are permanently secured by screws 42 to the one wall and arranged to be fastened by other screws 42 to the adjoining wall. In a similar manner, right angle straps 43 are secured permanently by screws 44 to the walls and arranged to be secured detachably by other screws 44 to the floor 14. In like manner, right angle straps 45 are secured to the walls by screws 46 and arranged to be detachably secured by other screws 46 to the top 40, the latter having parallel wooden cleats 47 secured to the inner side thereof to enable use of thin and fairly pliable building board for the top and yet secure the desired rigidity by means of these wooden cleats, as well as provide ample thickness for the entry of the necessary screws. Of course, when the straps 41 are applied in each corner of the structure the adjoining sides 35, 36, and 37 are thereby firmly secured together. Likewise, the fastening of straps 43 to the floor, and straps 45 to the top, make the structure firm. The post 48 on which the door 13 is hinged, as indicated at 49 in Fig. 1, has one edge of the front panel 37 entered in a vertical groove 50 provided in one side thereof, as shown in Fig. 6, and straight straps 51 are provided, which are secured by screws 52 permanently to the front wall 37 on boards 38 and 39, and other screws 52 are used to fasten the straps 51 to the post 48. A wide vertical board 53 is provided to complete the front wall of the vestibule between the free edge of the door 13 and the wall of the trailer and is fastened at its lower end by right angle straps 54 to the floor 14 and at its upper end by a right angle strap 55 to the top 40. If desired, larger reinforcing brackets 56 and 57 may be provided in the corners at top and bottom in the inner end of the vestibule to lend rigidity to the structure. Strips 58 are suitably secured to the inner sides of the walls 35, 36, and 37, at an intermediate height, partly for trim and partly for utility, inasmuch as clothes hooks may be fastened to these rails.

It is evident from the foregoing description that I have provided a vestibule of knock-down construction that may be quickly set up and attached to the side of a trailer upon arrival at the camp site and as quickly taken apart later for storage in the trailer in transit. The front, back and outer side walls may be laid on top of one another on the floor 14 or stood on edge in abutment with one another when disassembled, and the same is true of the top 40. The supporting base 11, as should be evident from Fig. 3, is also adapted to be taken apart easily if that is necessary in order to store it in the trailer in transit. The disassembled structures take up very little space, and the individual parts are also light enough for a person to handle easily. Any handy man, with little or no help, can easily set the vestibule and supporting base and take them apart.

It is believed the foregoing description conveys a good understanding of the objects and advantages of my invention. The appended claims have been drawn to cover all legitimate modifications and adaptations.

I claim:

1. In a knockdown trailer auxiliary building structure, the combination of a generally rectangular floor panel, vertical corner posts resting on corner portions of said floor panel and having vertically extending grooves provided in two adjoining faces, side wall panels resting on side portions of the floor panel and having edge portions fitting in the grooves, means detachably securing adjoining end portions of adjacent side wall panels together thereby securing the corner posts therebetween, means for detachably securing the side wall panels to the floor panel, a top panel resting on the top portions of the side wall panels, means for detachably securing these panels in assembled abutting relationship, and a supporting base comprising a rectangular frame of the same dimensions as the floor panel having depending supporting legs and upwardly projecting locating portions arranged for locating abutment with the edges of the floor panel, these projections engaging only one end and two opposite sides of the floor panel, whereby the base is adapted to be slid endwise relative to the floor panel into and out of supporting relationship to the auxiliary building structure.

2. In a knockdown trailer auxiliary building structure, the combination of a generally rectangular floor panel, side wall panels resting on side portions of the floor panel and joined together at adjoining ends, means detachably securing the side wall panels to the floor panel, a top panel resting on the top portions of the side wall panels, means for detachably securing these panels in assembled relationship, and a supporting base comprising a rectangular frame of the same dimensions as the floor panel having depending supporting legs at the corners thereof, and having projecting upwardly from said legs locating corner portions arranged for locating abutment with the edges of the floor panel at the corners thereof, these projections engaging only one end and two opposite sides of the floor panel, whereby the base is adapted to be slid endwise relative to the floor panel into and out of supporting relationship to the auxiliary building structure.

3. In combination, a trailer comprising a body having a floor and a side wall with an entrance door opening provided therein, a separate auxiliary building structure that is open on one side and is assembled onto said trailer with the open side against the exterior of said side wall enclosing said entrance opening, said auxiliary building structure comprising a rectangular floor and three side walls and a top in rigid relationship to one another, one of said three side walls having a second entrance opening provided therein, and a door hinged therein, said floor having fastened onto the bottom thereof and extending substantially the full length of two sides thereof two elongated parallel cleats for reinforcement of the floor, said cleats being disposed at right angles to the side of the trailer body abutted by the auxiliary building structure and having their ends extending from the open side of the auxiliary building structure and abutting the bottom of the floor of the trailer to limit upward displacement of the auxiliary building floor relative to the trailer floor and locate the auxiliary building floor substantially flush with the trailer floor, and means supporting the auxiliary building structure elevated sufficiently in relation to the trailer body so that said cleat extensions remain firmly engaged with the bottom of the trailer floor, said means comprising a supporting base having a top portion slidable endwise relative to said cleats under the floor panel into and out of supporting relationship to the auxiliary building structure, said base having depending supporting legs and upwardly projecting locating portions arranged for locating abutment with the edges of the floor panel, these projections engaging one end and two opposite sides of the floor panel.

References Cited in the file of this patent

UNITED STATES PATENTS

| | | |
|---|---|---|
| 153,085 | Justice | July 14, 1874 |
| 865,590 | Horton | Sept. 10, 1907 |
| 1,070,474 | Hoyt | Aug. 19, 1913 |
| 2,006,477 | Pendry | July 2, 1935 |
| 2,247,340 | Webster | June 24, 1941 |
| 2,484,312 | Rebours | Oct. 11, 1949 |